United States Patent
Lim et al.

(10) Patent No.: US 9,491,447 B2
(45) Date of Patent: Nov. 8, 2016

(54) SYSTEM FOR PROVIDING COMPLEX-DIMENSIONAL CONTENT SERVICE USING COMPLEX 2D-3D CONTENT FILE, METHOD FOR PROVIDING SAID SERVICE, AND COMPLEX-DIMENSIONAL CONTENT FILE THEREFOR

(71) Applicant: MOOOVR INC., Gyeonggi-do (KR)

(72) Inventors: Hyoung Bin Lim, Gyeonggi-do (KR); Se Joon Lee, Incheon (KR)

(73) Assignee: MOOOVR INC., Gyeonggi-do (KR)

( * ) Notice: Subject to any disclaimer, the term of this patent is extended or adjusted under 35 U.S.C. 154(b) by 0 days.

(21) Appl. No.: 14/826,185

(22) Filed: Aug. 13, 2015

(65) Prior Publication Data
US 2015/0350634 A1 Dec. 3, 2015

Related U.S. Application Data

(63) Continuation of application No. PCT/KR2013/011934, filed on Dec. 20, 2013.

(30) Foreign Application Priority Data

Feb. 20, 2013 (KR) .................. 10-2013-0017860

(51) Int. Cl.
*H04N 13/00* (2006.01)
*H04N 13/04* (2006.01)

(52) U.S. Cl.
CPC ...... *H04N 13/0456* (2013.01); *H04N 13/0033* (2013.01); *H04N 13/0055* (2013.01); *H04N 13/0454* (2013.01)

(58) Field of Classification Search
CPC .............. H04N 13/0456; H04N 13/0033; H04N 13/0055; H04N 13/0454
USPC ............................................. 348/51
See application file for complete search history.

(56) References Cited

U.S. PATENT DOCUMENTS

| | | | |
|---|---|---|---|
| 2003/0038798 A1* | 2/2003 | Besl | G06T 15/00 345/420 |
| 2009/0317061 A1* | 12/2009 | Jung | G06T 9/00 386/248 |

(Continued)

FOREIGN PATENT DOCUMENTS

| | | |
|---|---|---|
| CN | 101897194 | 11/2010 |
| KR | 10-2008-0108934 A | 12/2008 |

(Continued)

*Primary Examiner* — Jeffery Williams
(74) *Attorney, Agent, or Firm* — Husch Blackwell LLP

(57) ABSTRACT

An information processing method of a multidimensional content providing system for providing a user with a multidimensional content including at least one 2D video section and at least one 3D video section is provided. The method includes the steps of: (a) the multidimensional content providing system playing the 2D video section with a 2D player; (b) the multidimensional content providing system playing the 3D video section with the 2D player; (c) the multidimensional content providing system acquiring a distorted image during the play at the step (b); (d) the multidimensional content providing system applying a rendering process to the distorted image acquired at the step (c) by using a 3D rendering engine; and (e) the multidimensional content providing system providing the rendered image for the user.

20 Claims, 11 Drawing Sheets

(56) References Cited

U.S. PATENT DOCUMENTS

| | | | | |
|---|---|---|---|---|
| 2010/0303442 A1* | 12/2010 | Newton | H04N 13/0033 | 386/241 |
| 2012/0200668 A1* | 8/2012 | Maruyama | H04N 13/0055 | 348/43 |
| 2012/0242802 A1* | 9/2012 | Tsukagoshi | H04N 7/025 | 348/46 |
| 2012/0300026 A1* | 11/2012 | Allen | H04N 13/0048 | 348/43 |

FOREIGN PATENT DOCUMENTS

| | | |
|---|---|---|
| KR | 10-2009-0025836 A | 3/2009 |
| KR | 10-2009-0035794 A | 4/2009 |
| KR | 10-2011-0029319 A | 3/2011 |
| KR | 10-2011-0111335 A | 10/2011 |
| WO | 2011/021894 | 2/2011 |

* cited by examiner

FIG. 9
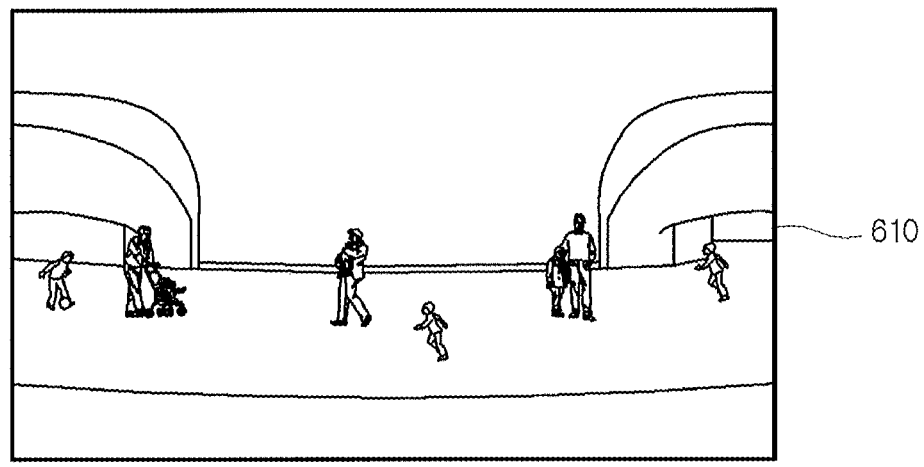

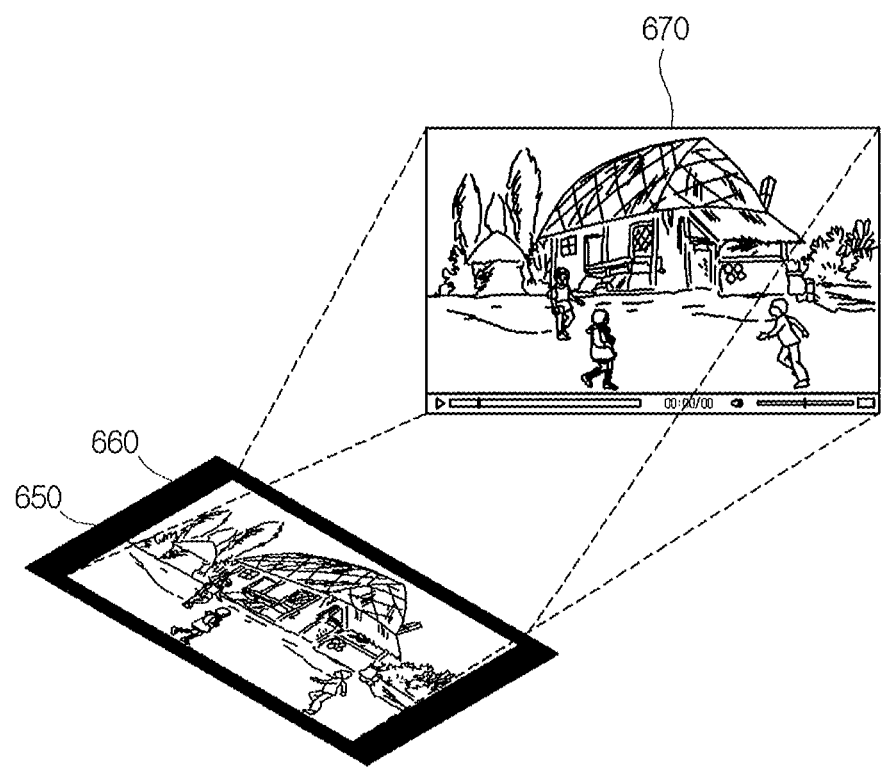

SYSTEM FOR PROVIDING COMPLEX-DIMENSIONAL CONTENT SERVICE USING COMPLEX 2D-3D CONTENT FILE, METHOD FOR PROVIDING SAID SERVICE, AND COMPLEX-DIMENSIONAL CONTENT FILE THEREFOR

CROSS REFERENCE TO RELATED APPLICATIONS

This application is a continuation of prior International Application PCT Application No. PCT/KR2013/011934 filed on Dec. 20, 2013, which claims the benefit of priority from Korean Patent Application No. 10-2013-0017860 filed on Feb. 20, 2013. The disclosures of International Application PCT Application No. PCT/KR2013/011934 and Korean Patent Application No. 10-2013-0017860 are incorporated herein by reference.

FIELD OF THE INVENTION

The present invention relates to a system and a method for providing a multidimensional content service by using a content file including at least one 2D video section and at least one 3D video section; and more particularly, to the system and the method for playing the content file including the at least one 2D video temporal section and the at least one 3D video temporal section by using a single player.

BACKGROUND OF THE INVENTION

In the past, multiple videos were taken at several angles with cameras to provide panoramic images or videos. Even if a user had a photo-taking instrument and a special viewer to see such images or videos, if the user had a computer with its poor performance, there was a problem of playing such videos smoothly. But as instruments that 3D images can be taken with more conveniently appears and the performance of users' computers is more upgraded, the problem now is how great contents can be provided for users.

Respective 3D videos and 2D videos can have different merits for various users. Accordingly, if a multidimensional content in which at least one 2D video section and at least one 3D video section are included, such a content is predicted to catch popularity from a lot of users.

If a 2D video section in the multidimensional content is played by using a player for playing 2D video section and then by using another player for playing 3D video section or vice versa, it takes a long time to smoothly play the multidimensional content at a boundary point of time, i.e., at the point of time when the playing section thereof is changed from the 2D video section to the 3D video section or vice versa. In this case, the user may misunderstand it as an end of the multidimensional content.

Hence, the necessity of multidimensional contents composed of an integrated edition of 2D and 3D video sections is on the rise. However, the integrated edition method has several problems as follows: a problem of controlling black borders at the top and bottom of the 2D video due to the different sizes of the 2D and 3D videos, a problem of controlling 3D rendering only after recognizing a temporal location of the 2D and the 3D video sections, and the like.

Accordingly, technical methods for introducing, configuring, and servicing multidimensional contents have been desperately required.

When images such as videos, etc. were provided for users, 2D contents were generally played by a 2D player and panoramic images were provided by a 3D player which plays 3D contents exclusively.

At the time, the 2D and the 3D contents were not provided for users by using the same player and furthermore if at least one 2D video section and at least one 3D video section are integrated into one single file, the service was not provided through a single player.

If a 2D video section and a 3D video section are integrated into a single multidimensional content for various fields such as sports, music, movies, documentaries, education, advertising, etc., special experiences, particularly, would be provided for users. Therefore, the development of systems and methods for providing the multidimensional contents including the 2D video sections and the 3D video sections has been desperately required.

SUMMARY OF THE INVENTION

It is a first object of the present invention to suggest a multidimensional content providing system.

It is a second object of the present invention to suggest a method for processing information in the multidimensional content providing system.

It is a third object of the present invention to suggest a configuration of a multidimensional content file.

In accordance with one aspect of the present invention, there is provided an information processing method of a multidimensional content providing system for providing a user with a multidimensional content including at least one 2D video section and at least one 3D video section, including the steps of: (a) the multidimensional content providing system playing the 2D video section with a 2D player; (b) the multidimensional content providing system playing the 3D video section with the 2D player; (c) the multidimensional content providing system acquiring a distorted image during the play at the step (b); (d) the multidimensional content providing system applying a rendering process to the distorted image acquired at the step (c) by using a 3D rendering engine; and (e) the multidimensional content providing system providing the rendered image for the user; wherein the multidimensional content providing system acquires information on starting points and information on ranges of sections with respect to the 2D video section and the 3D video section, respectively; and wherein the step (a) is executed at the starting point of the 2D video section and the step (b) is executed at that of the 3D video section.

In accordance with another aspect of the present invention, there is provided a multidimensional content providing system for providing a user with a multidimensional content including at least one 2D video section and at least one 3D video section, including: a 2D player for playing the 2D video section and the 3D video section; a playing section information acquiring part for acquiring information on attribute of the playing section to identify whether a video section to be played is a 2D or a 3D video section; a distorted image acquiring part for acquiring a result of the 2D player playing the 3D video section; and a rendering part for applying a rendering process to the distorted image acquired by the distorted image acquiring part with a 3D rendering engine; wherein the playing section information acquiring part acquires information on starting points and information on ranges of sections with respect to the 2D video section and the 3D video section, respectively.

In accordance with still another aspect of the present invention, there is provided a multidimensional content file, including: a file header; and a video data part; wherein the video data part includes at least one 2D video section and at least one 3D video section and the 2D video section and the 3D video section appear at least once by turns and the file header further includes playing section property information, and the playing section property information includes information on video data corresponding to the 2D video section and the 3D video section.

BRIEF DESCRIPTION OF THE DRAWINGS

The above and other objects and features of the present invention will become apparent from the following description of preferred embodiments given in conjunction with the accompanying drawings, in which:

FIG. 9 is a drawing illustrating a general comparison between a 2D video and a 3D video.

FIG. 11 is a drawing showing a status where black borders are removed from the provided 2D video.

DETAILED DESCRIPTION OF THE PREFERRED EMBODIMENTS

Figure 1:
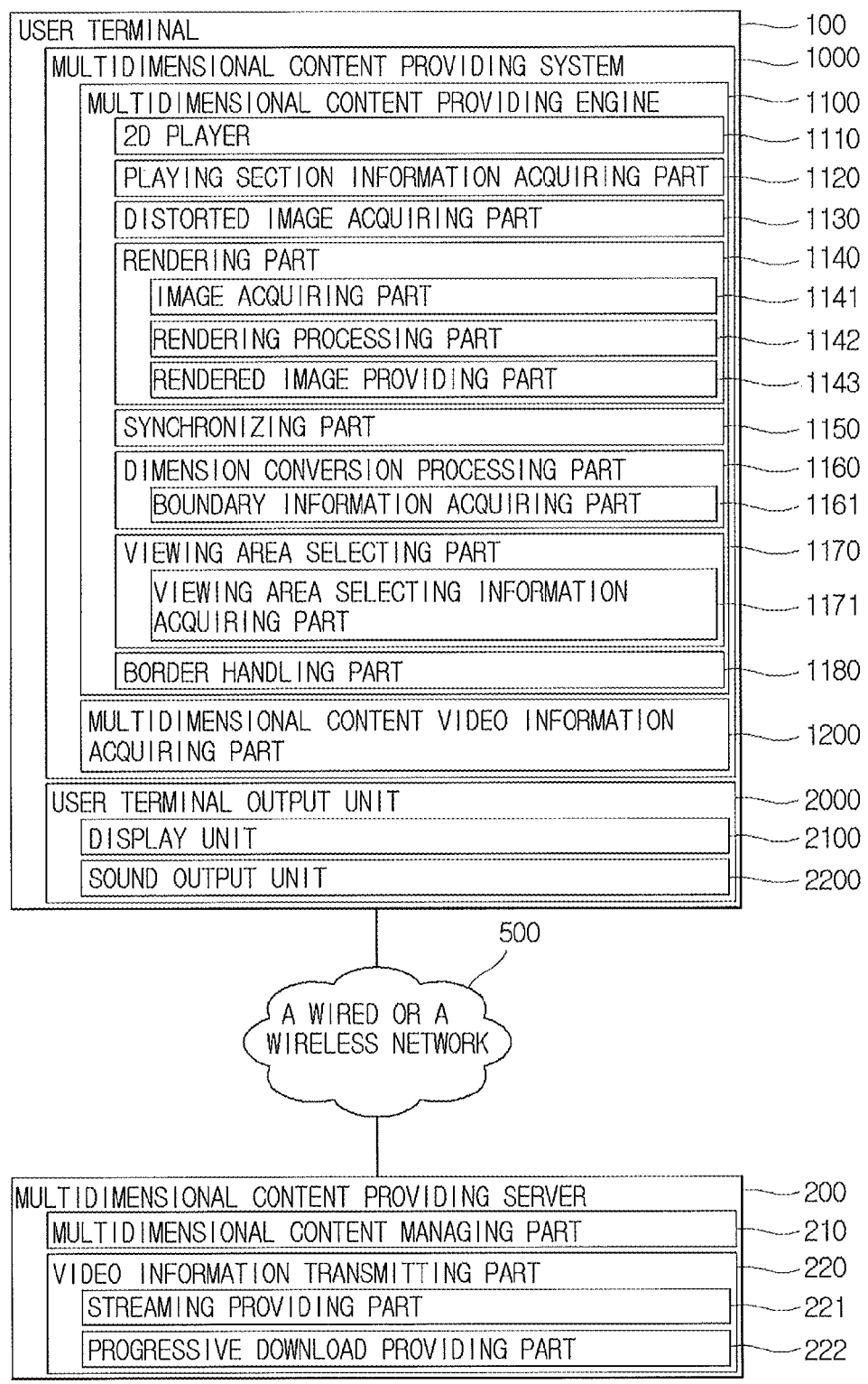
FIG. 1 is a diagram illustrating a systematic configuration for providing a multidimensional content in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
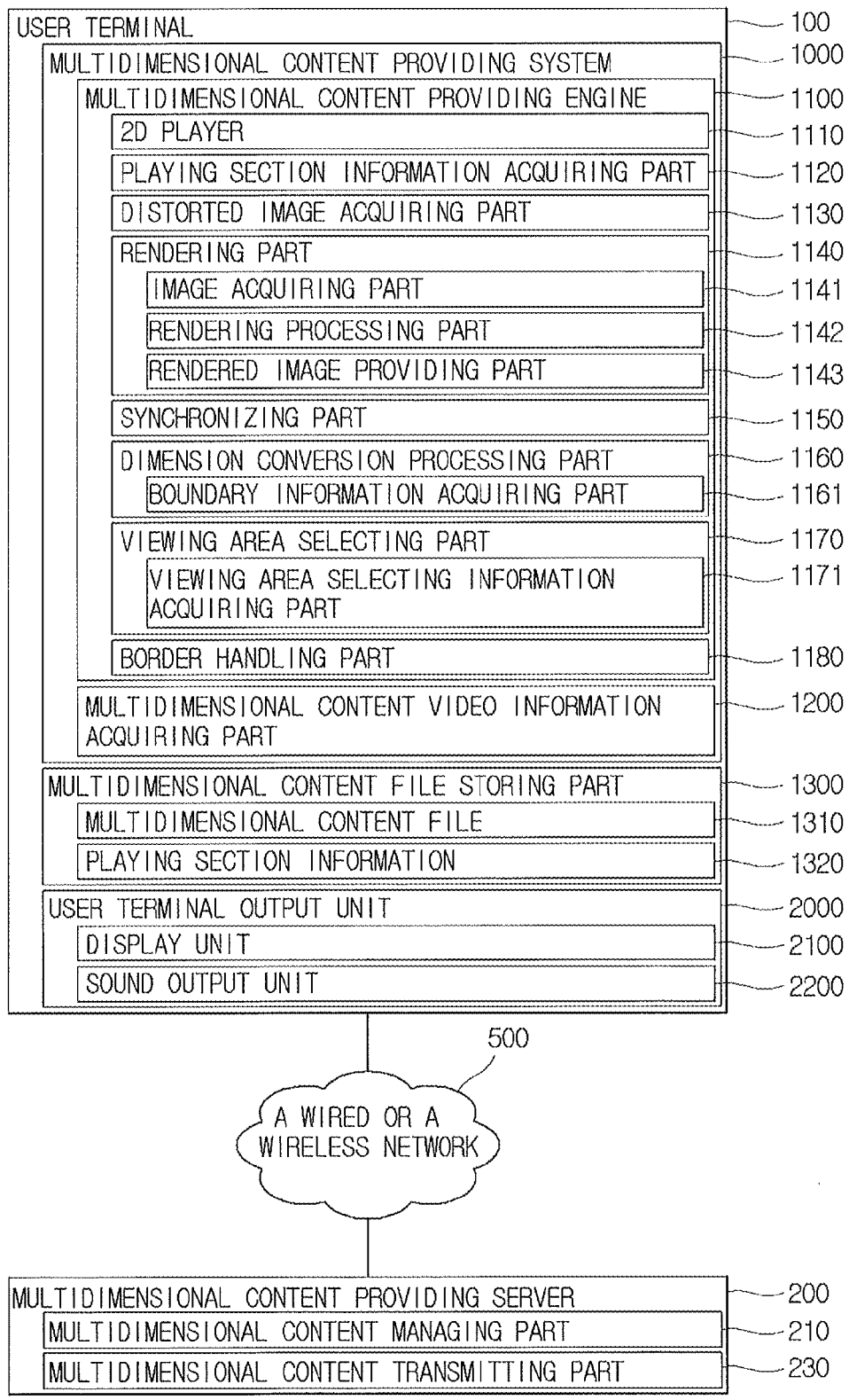
FIG. 2 is a diagram showing another systematic configuration for providing a multidimensional content in accordance with one example embodiment of the present invention.

To allow those skilled in the art to the present invention to be carried out easily, the example embodiments of the present invention by referring to attached diagrams will be explained in detail as follows:

FIGS. 1 and 2 are diagrams illustrating configurations for providing multidimensional contents in accordance with the present invention. At least one user terminal 100 in which a multidimensional content providing system 1000 is included is connected with at least one multidimensional content providing server 200 through a wired or a wireless network 500. The multidimensional content providing system 1000 may include a multidimensional content providing engine 1100 capable of executing the spirit of the present invention for the multidimensional content file downloaded from the multidimensional content providing server 200 or stored in the user terminal 100 or that for multidimensional content information received from the multidimensional content providing server 200.

The multidimensional content providing engine 1100 in the present invention includes a 2D player 1110 for playing a multidimensional content, a playing section information acquiring part 1120 for acquiring information on a 2D video section and a 3D video section included in the multidimensional content, a distorted image acquiring part 1130 for acquiring a distorted image created when the 2D player 1110 plays the 3D video section included in the multidimensional content, and a rendering part 1140 for rendering the distorted image. Meanwhile, the multidimensional content providing engine 1100 may further include a synchronizing part 1150 for making video information included in the multidimensional content played by using the 2D player 1110 and sound information included in the multidimensional content synchronized and allowing the synchronized multidimensional content to be outputted through an output unit 2000. Besides, the multidimensional content providing engine 1100 may further include a dimension conversion processing part 1160 for increasing quality of video provided from a display unit 2100 when a playing status is converted from the 2D video section to the 3D video section or vice versa. Furthermore, the multidimensional content providing engine 1100 may further include a viewing area selecting part 1170 for allowing a viewing area 620, i.e., an area the user wants to watch, in the 3D video section to be set and changed.

There may be largely two types of video information which are processed by the multidimensional content providing system 1000. The first type may be multidimensional content video information transmitted to the user terminal 100 in a streaming method, a progressive download method, etc. by the multidimensional content providing server 200, and the second type may be a type of multidimensional content file where the multidimensional content is stored. FIG. 1 is a diagram illustrating a method of the multidimensional content providing engine 1100 for processing video information of the multidimensional content. Herein, a multidimensional content video information acquiring part 1200 of the user terminal 100 may acquire the information of the multidimensional content from a video information transmitting part 220 of the multidimensional content providing server 200 in accordance with one example embodiment of the present invention. FIG. 2 is a diagram showing a method of the multidimensional content providing engine 1100 for processing the multidimensional content file transmitted from a multidimensional content file transmitting part of the multidimensional content providing server 200 by a file acquiring part of the user terminal 100 in accordance with one example embodiment of the present invention. Of course, the user terminal 100 may include all functions of FIGS. 1 and 2 and even the multidimensional content providing server 200 may do the same. The user terminal 100 may acquire the video information of the multidimensional content from a multidimensional content providing server 200, or acquire a multidimensional content file from another multidimensional content providing server 200 or may allow at least one multidimensional content file to be stored in the user terminal 100 by a random method such as USB or attached file. The same multidimensional content providing server 200 could transmit the video information of the multidimensional content to the user terminal 100 but could transmit the multidimensional content file thereto. Accordingly, although it is not illustrated, it is made clear to those skilled in the art that a hybrid type in which the embodiment of FIG. 1 and that of FIG. 2 are combined may be formed.

Figure 7:
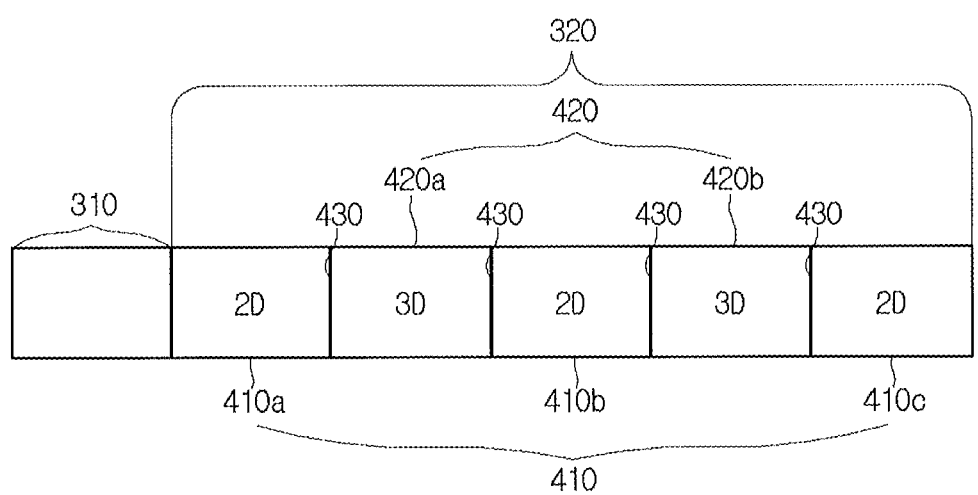
FIG. 7 is a drawing showing a configuration of a multidimensional content in accordance with one example embodiment of the present invention.
Figure 8:
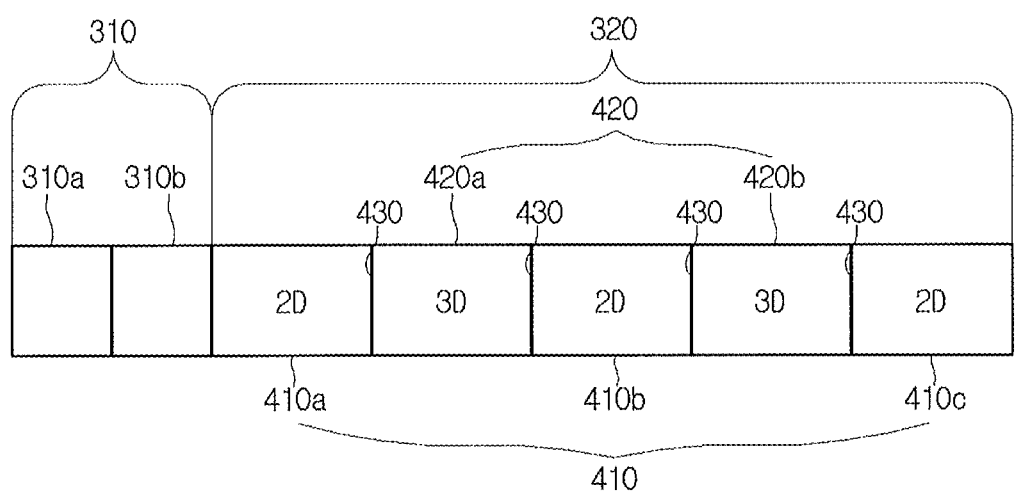
FIG. 8 is a drawing showing a configuration of a multidimensional content in accordance with another example embodiment of the present invention.

The multidimensional content file of the present invention is configured in a special method. FIGS. 7 and 8 show configuration types of multidimensional content files in accordance with one example embodiment of the present invention.

The multidimensional content file is composed of a multidimensional content header and multidimensional content data. A normal file header is illustrated in FIG. 7, and a unique multidimensional content header of the present invention is shown in FIG. 8. The multidimensional content header in FIG. 8 further includes a normal file header and a playing section information header which includes information on playing section in the multidimensional contents. As shown in FIGS. 7 and 8, the multidimensional content data of the present invention particularly include at least one of 2D data and 3D data, respectively. Multidimensional contents illustrated in FIGS. 7 and 8 include three 2D data parts and two 3D data parts. The video information of the 2D data part corresponds to a 2D video section from the viewpoint of a subject to play and the video information of the 3D data part corresponds to a 3D video section. In FIGS. 7 and 8, it is shown that the multidimensional content starts from, and ends with, the 2D video section, but it is made clear to those skilled in the art that it could start from, and end with, the 3D video section. Between the 2D video section and 3D video section is a boundary section. It would be desirable that the boundary section is identified as a boundary moving from the 2D video section to the 3D video section or vice versa as a conceptual subject rather than a physical reality.

In the multidimensional content data of the present invention, the 2D video section and the 3D video section are alternated. The 2D video section and the 3D video section correspond to a time zone or a frame section from the aspect of the playing the multidimensional content.

Table 1 below explains information on correspondence between such video sections and a time zone or a frame section.

TABLE 1

| Reference Number | Corresponding Time Zone | Corresponding Frame Number Section |
|---|---|---|
| 410A | T1-T2 | Frame Number_A-Frame Number_B |
| 420A | T2-T3 | Frame Number_B+1-Frame Number_C |
| 410B | T3-T4 | Frame Number_C+1-Frame Number_D |
| 420B | T4-T5 | Frame Number_D+1-Frame Number_E |
| 410C | T5-T6 | Frame Number_E+1-Frame Number_F |

In the corresponding frame number sections of Table 1, _A, _B, _C, _D, and _E indicate frame numbers.

The 2D video section corresponding to a reference number 410A corresponds to the playing time zone between T1 and T2 and the video frame number section between Frame Number_A and Frame Number_B. In general, the time such as T1, T2, etc. is in a unit of second or more fragmented time. Upon playing videos, one second as a playing time corresponds to 28 or 32 frames at a normal video playing speed, but it may correspond to more or less frames, as the case may be. The start of the frame number corresponding to reference number 420A as the first 3D video section is indicated as Frame Number_B+1. The Frame Number_B+1 is by one frame more than Frame Number_B as the last frame number of the previous 2D video section. Of course, it is appropriate to indicate that even a time T2 of the reference number 420A as the start time of the first 3D video section should be set to be larger than a time T2 of the reference number 410A as the last time of the previous 2D video section, by at least one time unit, but it could be enough to understand the purpose of the spirit of the present invention by those skilled in the art even though the time section of the first 3D video section is represented as "T2-T3". That is, T1 or Frame Number_a, etc. can be considered as a starting point of the 2D video section and T2 or Frame Number_b+1, etc. can be considered as a starting point of the 3D video section.

As shown in Table 1, playing section information (e.g., information on which time section or frame section the 2D video section or the 3D video section correspond to) may be included in the playing section information header of the present invention as shown in FIG. 8. In such case, the player may classify whether the currently playing video corresponds to a 2D or a 3D video section by referring to the playing section information.

Irrespective of the fact that the playing section information exists in the playing section information header, the playing section information may exist outside of the playing section information header. As shown in FIG. 1, when receiving video information on the multidimensional content through the video information transmitting part 220 of the multidimensional content providing server 200, a playing section information acquiring part 1120 may receive the playing section information of the multidimensional contents from the multidimensional content providing server 200 independently or upon the transmission of the video information on the multidimensional content. By taking shots of the received playing section information, the distorted image acquiring part 1130 of the multidimensional content providing engine 1100 may acquire the distorted image which can be created when the 3D video section is played by using the 2D player to thereby allow the rendering part 1140 to render the multidimensional content. Meanwhile, as illustrated in FIG. 2, when the multidimensional content file is acquired, the playing section information could be acquired independently of the multidimensional content file. In general, if there is a video file, just as information on subtitles of the video file is provided in a SMI file type, the playing section information may be also provided in an independent file type and the playing section information acquiring part 1120 could use the playing section information to achieve the spirit of the present invention. As shown in FIG. 2, the playing section information could be stored in a multidimensional content file storing part 1300 where individual multidimensional contents are stored.

In a file where the playing section information is included, information such as Table 1 could be included. (The corresponding frame section information would be more appropriate to be included.) Information on the content of such a file could be as follows:

---

<Start Frame Number_A>
2D
<End Frame Number_B>
<Start Frame Number_B+1>
3D
<End Frame Number_C>
<Start Frame Number_C+1>
2D
<End Frame Number_D>
<Start Frame Number_D+1>
3D
<End Frame Number_E>
<Start Frame Number_E+1>
2D
<End Frame Number_F>
"Start Frame Number" would be a frame number which starts and "End Frame Number" would be a frame number which ends.

---

To detect a section, it must be set from which to which the 2D video section and the 3D video section could be played in a unit of time (second or shorter) or frame. Such information could be stored in the playing section information with respect to a multidimensional content and a format to be saved could be xml. If a video is streamed and played by setting a timeline between the start point of the video and the end point thereof through an object "GTweenTimeline" within the player, meta data of the video is acquired in a pre-determined unit of second or shorter in real time from the multidimensional content providing server 200 to thereby determine a current time in progress and it could be determined whether the time/frame number is matched with a playing section/a playing time zone of the 2D video section and the 3D video section set in the xml file where the playing section information is included.

Figure 3:
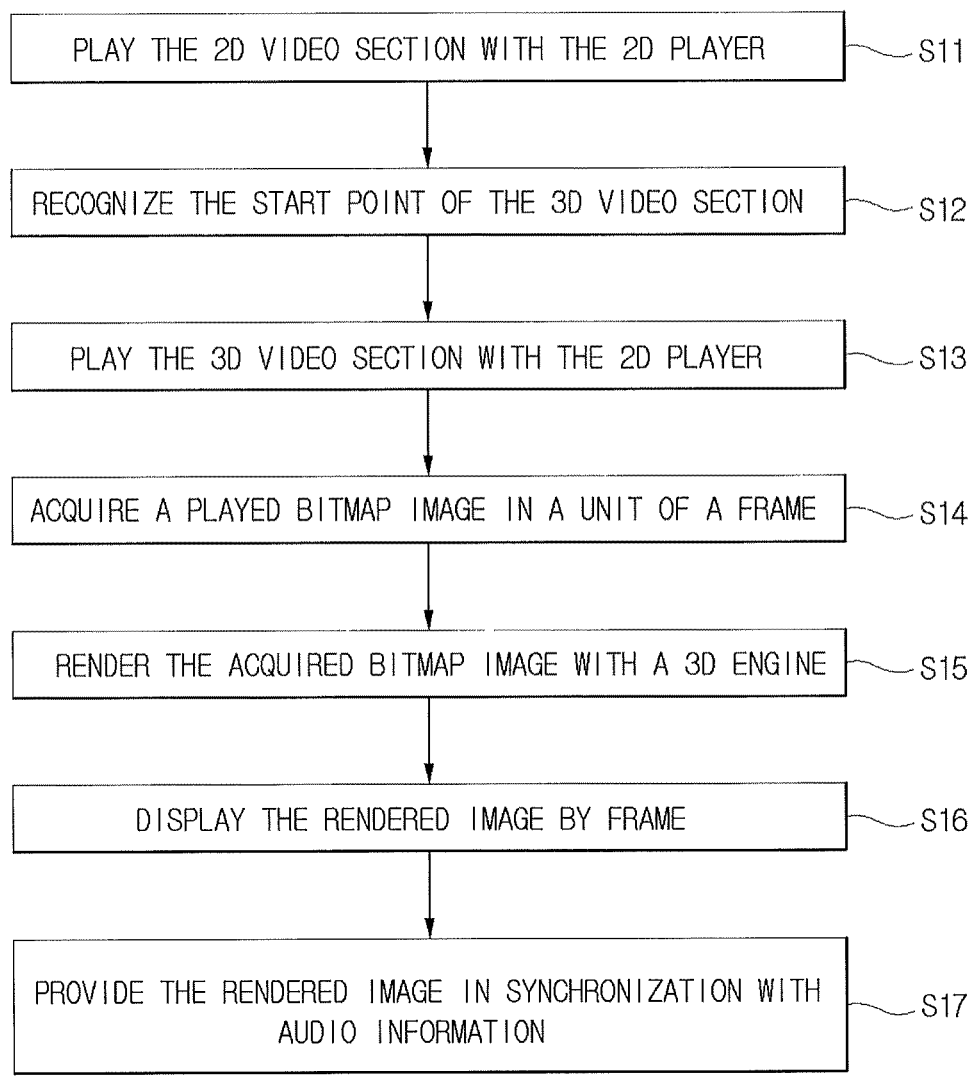
FIG. 3 is a diagram illustrating a method for processing information in a multidimensional content providing system in accordance with one example embodiment of the present invention.

Next, the spirit of the present invention will be explained in more detail by referring to drawings. FIG. 3 illustrates an information processing method of the multidimensional content providing system 1000 in accordance with one example embodiment of the present invention. The multidimensional content providing system 1000 plays the 2D video section with the 2D player at a step of S11, recognizes the start point of the 3D video section at a step of S12, plays the 3D video section with the 2D player at a step of S13, acquires a played bitmap image in a unit of a frame at a step of S14, renders the acquired bitmap image with a 3D engine at a step of S15, displays the rendered image by frame at a step of S16, and provides the rendered image in synchronization with audio information at a step of S17.

The multidimensional content providing system 1000 of the present invention plays either the 2D video section or the 3D video section with one 2D player. If the 3D video section is played with the 2D player, the distorted image is created.

If the playing section information acquiring part 1120 acquires the fact that a video section played at a specific point of time is a 3D video section, the multidimensional content providing engine 1100 may not send the 3D video section immediately to the user terminal output unit 2000. The distorted image acquiring part 1130 acquires a distorted bitmap image as the result of playing the 3D video section through the 2D player 1110.

A rendering processing part 1142 of the rendering part 1140 processes the rendering of the distorted bitmap image acquired by a distorted image acquiring part 1141. The distorted bitmap image is acquired in a unit of a frame and the rendering of the bitmap image is executed in a unit of a frame.

There are two types of rendering process: a sphere type and a cube type. The sphere type is a method for allowing users to view a more detailed screen because the rendering is made on a sphere. If a content with a lot of straight lines is rendered, the sphere type, however, may cause the lines to be wrinkled. Meanwhile, the cube type is a method for rendering bitmap data of texture to six sides of a regular hexahedron. In case of a video with many horizons and verticals, a plurality of lines could be expressed in straighter lines more appropriately than in the sphere type. But it is impossible to complete the rendering process by taking only a one-time shot in case of the cube type but instead a plurality of shots should be taken for the respective sides of the regular hexahedron.

For example, if a program "papervision3d" is used, bitmap data captured in one unit of frame may be converted to make a spherical object rendered by using the sphere type. At the time, if the number of frames of the converted data is less than 30 frames, a QuadrantRenderEngine object as a rendering engine in "papervision3d" starts 3D rendering process for the respective frames with the sphere type. The rendered image is provided to the outside of the rendering part 1140 through a rendered image providing part 1143.

The synchronizing part 1150 of the present invention synchronizes sound information and the rendered image which are played by the 2D player. As a result, the sound information and the video information can be provided at the same time. Independently from the creation of the distorted image or the rendering process, the 2D video section or the 3D video section is steadily played through the 2D player in the background. At the time, because the distorted image played through the 2D player should be rendered, it takes a longer time than to provide the image of the 2D video section through the normal 2D player. Accordingly, it is necessary to synchronize voices, sound, etc. and the rendered image when the 2D player plays the 3D video section. The detailed method for synchronizing the rendered image and the sound (voice, etc.) while the 3D video section is played through the 2D player is clear to those skilled in the art. Therefore, the detailed explanation will be omitted.

Figure 4:
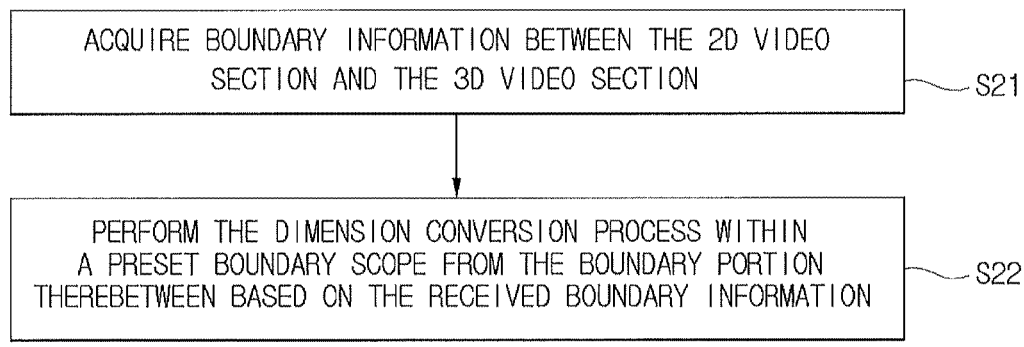
FIG. 4 is a diagram showing the method for processing information in the multidimensional content providing system in accordance with another example embodiment of the present invention.

In addition, the dimension conversion processing part 1160 of the present invention will be explained by referring to FIG. 4.

When the 2D video section ends and then the 3D video section starts through the player or vice versa, an inconvenient situation such as a phenomenon of the screen being cracked due to several causes (particularly, the specifications of the computer) may occur to the users. Therefore, it is necessary to convert or switch smoothly from one status, e.g., the 2D video section, to another status, e.g., the 3D video section, without giving any inconvenience to users.

The dimension conversion processing part 1160 acquires boundary information between the 2D video section and the 3D video section at a step of S21 and performs the dimension conversion process within a preset boundary scope from the boundary portion therebetween based on the received boundary information at a step of S22. The dimension conversion processing part 1160 acquires the boundary information between the 2D video section and the 3D video section and performs the dimension conversion process within the preset boundary scope therefrom based on the acquired boundary information. A boundary information acquiring part 1161 of the dimension conversion processing part 1160 acquires information on the boundary portion and performs the dimension conversion process near the boundary portion.

What actually occurs at the boundary section between the 2D video section and the 3D video section is a conversion between a spherical object and a plane object. At the time, when a logic of applying fade-in or fade-out effects during the conversion is put, the screen may be naturally converted. As such, at the moment that the 2D video section is converted to the 3D video section or vice versa, the dimension conversion processing part may prevent the cracked screen from appearing by adding objects having the fade-in and the fade-out effects to some frames around the boundary section.

By referring to FIGS. 5 and 6, the viewing area selecting part 1170 of the present invention will be explained below.

The multidimensional content providing engine 1100 may allow at least one prefixed area of the rendered image to be provided as a viewing area 620 exposed to the users. The viewing area 620 can be set by the user and it is desirable to be changed by the user during the play of the multidimensional content. Of course, information on the setting of the viewing area 620 may also be stored in the information on the multidimensional content header, received from the multidimensional content providing server 200 that provides the multidimensional content, set by the multidimensional content providing system 1000, or changed under the pre-decided rules of the setting of the viewing area.

Figure 5:
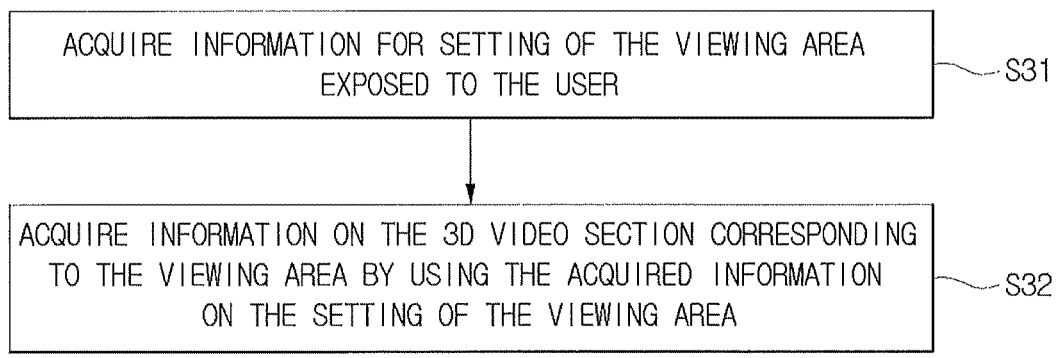
FIG. 5 is a diagram presenting the method for processing information in the multidimensional content providing system in accordance with still another example embodiment of the present invention.

FIG. 5 is an exemplary configuration presenting the method for setting the viewing area 620 from the outside instead of the user. The viewing area selecting part 1170 acquires information for setting of the viewing area 620 exposed to the user at a step of S31, and acquires information on the 3D video section corresponding to the viewing area 620 by using the acquired information on the setting of the viewing area 620 at a step of S32.

Figure 6:
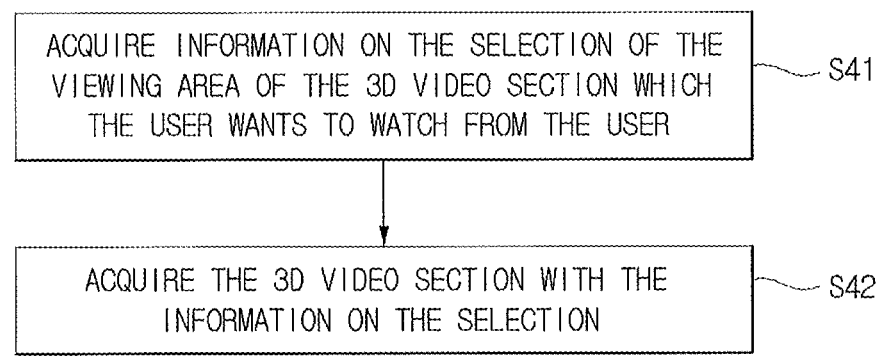
FIG. 6 is a diagram showing another systematic configuration for providing a multidimensional content in accordance with another example embodiment of the present invention.

FIG. 6 is a configuration of a method of the viewing area selecting part 1170 processing information in accordance with one example embodiment. The viewing area selecting part 1170 acquires information on the selection of the viewing area of the 3D video section which the user wants to watch from the user at a step of S41, and then the 3D video section with the information on the selection at a step of S42.

While the 3D video section is played, the user may watch a part, i.e., the viewing area, in frames of the 3D video section through the setting of the viewing area 620. By the setting of the viewing area 620, the direction of the viewing area may be designated or changed. It is desirable to designate or change the direction of the viewing area by one of keyboard input, keypad input, touch input, speech input, and gesture input. If the setting of the viewing area 620 is changed through such inputs, the multidimensional content providing system 1000 changes the viewing area 620 to be exposed to the user in the rendered image by using the changed information on the setting of the viewing area. For example, when a new viewing area 620 is designated to the left direction from the current viewing area 620 (by a gesture such as swiping the screen, e.g., a portion 630 of the 3D video section, from right to left with a finger, etc.) in FIG. 10, it may be controlled to change the status of the displaying screen from the current viewing area, i.e., the portion 630, where an adult holding his puppy dog in his arms and a kid appear to the new viewing area, i.e., a portion on the left of the portion 630, where an adult is wheeling a baby carriage in the 3D video 610.

When the spirit of the present invention is considered, particularly, if the image of the 3D video section is generated by using a method for making images acquired from multiple camera combined in one screen, and the user moves the direction to change the viewing area 620, an image corresponding to the direction may be exposed. In detail, there could be multiple camera lens with which images corresponding to two or more directions among a top, a bottom, a left, a right, a front and a back are acquired and respective images acquired from the lens could be combined to thereby generate one 3D video content. When the images are combined, an image acquired through specific lens could be controlled or edited to be placed at a specific position or area of the 3D video content. In such case, if the user presses the left button on the screen which the user is watching or touches to the left direction, an image on the left of the image the user has been watching may become a new viewing area and then be provided for the user. It is like the scene on the left when the person having looked at the front turns his or her head to the left and looks at the left. At the time, if the direction of the viewing area is changed, it is desirable that the multidimensional content providing system 1000 consecutively changes the viewing area to be exposed to the user by referring to the direction of the viewing area which may be changed as described above.

One example of the 3D video of the present invention may be a panoramic image. One panoramic image may be created by combining respective images corresponding to at least two of a top, a bottom, a left, a right, a front and a back acquired from the multiple lens of one camera or by combining images acquired from multiple cameras. In the case, the 3D video section may include a panoramic image.

Figure 10:
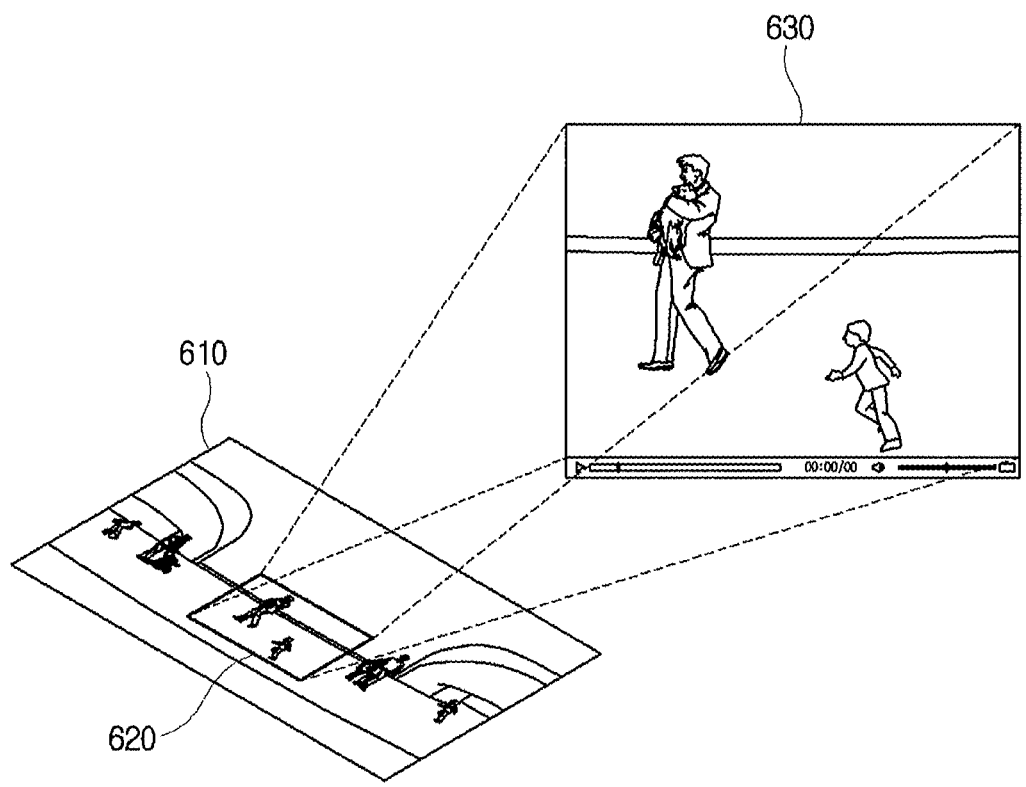
FIG. 10 is a drawing representing a status where a portion in the 3D video is selected.

In FIG. 10, a concept of selecting the viewing area 620 is illustrated. As shown in FIG. 10, the 3D video section that the user is watching is a part of the 3D video section. FIG. 10 illustrates that the viewing area 620, i.e., a boxed area included in a frame of the 3D video 610 which is playing, is provided to the user through the screen 630. At the time, if the user wants to change the direction of viewing on the screen the user is watching and the direction of the change is set by the user, another image with a preset size located in the changed direction (e.g., size of length n*width m) is provided for the user.

At the time, the subject for the rendering process by the rendering part 1140 may be the whole area in frames of the 3D video section, but only the viewing area 620 in the frames thereof may be rendered as well. In case of the former case, the result of the selection of the viewing area 620 may be applied to the rendered image (the selected viewing area is brought), but in the latter case, it may be applied to the distorted image as the subject to be rendered.

Now, a border handling part 1180 of the present invention will be explained by referring to FIGS. 9 and 11. FIG. 9 shows an example of comparison between a 3D video and a 2D video in accordance with one example embodiment of the present invention. As shown in FIGS. 9 and 11, it can be found that there are black borders 650 in the frames 660 of the 2D video section. When the 2D video section is played, the border handling part 1180 of the multidimensional content providing system 1000 may remove the borders in the frames of the 2D video section and provide only the image for the user. The methods for producing the 2D or the 3D videos may be different but both videos could be configured as one single file in a format of normal 2D video with 2400×1200 pixels. (As shown in FIG. 9, it can be found that the 3D video 610 and the 2D video 660 including the borders 650 have same number of pixels.) At the time, because the single file is produced at the same resolution, there is a case of producing the 2D video at the full HD resolution with borders left at 60 pixels from top and bottom and 240 pixels from both sides. It is because the 2D video section with 2400×1200 pixels has the black frame borders 650 except 1920×1080 pixels played in the central sections. As the black borders are always in the 2D video section of the multidimensional content video, the multidimensional content providing system 1000 may process information by detecting the black in the borders to automatically record metadata of the corresponding frame as the 2D section in the video header or record the timetable values as shown in Table 1. As the result, it could be easily possible to convert between the different kinds of the video sections by reading the timetable values during the playing of the multidimensional content.

The example of information process of the border handling part 1180 of the present invention can be explained as shown below. When the 2D video section is played, the actual size of the image may be adjusted through a class "CameraObject3D" (which can designate zoom, focus, etc. when a 3D object is played) in the "papervision3d" library. When the 2D video section is played, if it is set that camera.z (a function of setting a zoom)=−200, it can be controlled that the image becomes zoomed in and then the borders (i.e., the black borders) do not appear to the user. FIG. 11 shows the subjects 660 and 650 to be processed by the border handling part 1180 compared with the result image 670 in which the borders are removed.

Several methods can be considered to transfer video information from the multidimensional content providing server 200 to the user terminal 100 including the multidimensional content providing system 1000. It is desirable to use either HTTP or RTMP as the communication protocol. It is preferable that the content video information of the multidimensional contents is transferred from the multidimensional content providing server 200 to the user terminal 100 through progressive download or live streaming.

The progressive download which uses the HTTP with port 80 as the default protocol used in the web browser is a method for playing a video with a certain level of buffering while downloading the video.

The live streaming which uses an RTMP with port 1935 as the default protocol is a method for playing a video with a set post buffering at a time designated by the user by the metadata of the header sent in real time. Basically, the RTMP (live streaming) method that can receive the header value of the video could be more desirable.

Table 2 is a comparison between characteristics in the progressive download method and those in the live streaming method.

TABLE 2

| Item | Progressive Download (Method) | RTMP/RTSP Streaming (Method) |
|---|---|---|
| Server in Use | Web Server | Web Server + Media Server |
| Protocol | HTTP | RTMP/RTMPS/RTSP |
| Firewall Port in Use | 80 | 80 + 1935 |
| Live Relay | Impossible | Possible |
| Bandwidth Efficiency | low | average |
| File Downloading | Yes (Stored) | No |
| Security | low | average |
| Cost | low | average |
| Multi-encoding Support | No | Yes |
| Buffering | Yes | Yes |

The present invention has the following effects if it is used:

Firstly, the present invention may provide the multidimensional content for users without any distortion by using a single player.

Secondly, a specific part of the 3D video section that the user wants in the 3D video can be selected and the selected 3D video can be provided for the user.

Thirdly, the present invention could give special experiences to users when the multidimensional content including the 2D video section and the 3D video section is created and provided in various fields including sports, music, movie, documentary, education, and advertising.

The present invention may be used in a wide range of businesses relating to the fields as stated above and video industry.

What is claimed is:

1. A method of a multidimensional content providing system for providing a user with a multidimensional content including a 2D video section and a 3D video section, comprising steps of:
   (a) the multidimensional content providing system recognizing either piece of information on starting points and information on ranges of sections with respect to the 2D video section and the 3D video section, respectively;
   (b) the multidimensional content providing system acquiring a distorted image generated by playing the 3D video section through a 2D player, wherein frames included in the 3D video section are determined by referring to either piece of the information on starting points and the information on ranges of sections with respect to the 2D video section and the 3D video section, respectively; and
   (c) the multidimensional content providing system providing, or supporting to provide, a video content including (i) the 2D video section and (ii) a section acquired by applying a rendering process to the distorted image through a rendering engine,
   wherein the step of (c) includes the step of: performing a dimension conversion process for frames within a predetermined scope from a boundary between the 2D video section and the 3D video section, and
   wherein the dimension conversion process is applied to give fade-in or fade-out effects for the 2D video section and the 3D video section within the predetermined scope from the boundary.

2. The method of claim 1, wherein the information on starting points and the information on ranges of sections with respect to the 2D video section and the 3D video section includes a corresponding time zone or a start time or includes corresponding frame section or a start frame number, and wherein the information on starting points and the information on ranges of sections is stored outside the multidimensional content or included in a header of the multidimensional content file.

3. The method of claim 1, wherein the distorted image corresponding to the 3D video section is a bitmap image in a unit of frame and wherein the multidimensional content providing system applies the rendering process to frames in the distorted image by using a sphere type method or a cube type method.

4. The method of claim 1, wherein the multidimensional content providing system provides, or supports to provide, the multidimensional content for a user through a user terminal or at least one display unit connected with it through a wired or a wireless network.

5. The method of claim 1, wherein the multidimensional content providing system (i) downloads the multidimensional content in a type of file or (ii) receives data of the multidimensional content by using at least one protocol among HTTP and RTMP in real time through a progressive download method or a live streaming method from at least one server connected with a user terminal.

6. The method of claim 1, wherein, at the step of (c), the multidimensional content providing system provides, or supports to provide, a viewing screen area corresponding to a part of all the areas of frames included in the multidimensional content.

7. The method of claim 6, wherein the viewing screen area is decided by referring to setting information inputted by the user or determined by default values.

8. The method of claim 1, wherein the multidimensional content providing system is included in a user terminal.

9. The method of claim 1, wherein, at the step of (c), information on the video and audio of the multidimensional content is, or is supported to be, provided for the user by performing a process of synchronizing the video content acquired through the rendering process and audio content corresponding to the acquired video content.

10. A method of a multidimensional content providing system for providing a user with a multidimensional content including a 2D video section and a 3D video section, comprising steps of:
(a) the multidimensional content providing system recognizing either piece of information on starting points and information on ranges of sections with respect to the 2D video section and the 3D video section, respectively;
(b) the multidimensional content providing system acquiring a distorted image generated by playing the 3D video section through a 2D player, wherein frames included in the 3D video section are determined by referring to either piece of the information on starting points and the information on ranges of sections with respect to the 2D video section and the 3D video section, respectively; and
(c) the multidimensional content providing system providing, or supporting to provide, a video content including (i) the 2D video section and (ii) a section acquired by applying a rendering process to the distorted image through a rendering engine;
wherein the multidimensional content providing system provides, or supports to provide, the user with the video content to which a process of preventing borders occurring in the 2D video section is applied by referring to metadata on the borders caused by difference between the 2D image and the 3D image in number of pixels.

11. A multidimensional content providing system for providing a user with a multidimensional content including a 2D video section and a 3D video section, comprising:
a playing section information acquiring part for recognizing either piece of information on starting points and information on ranges of sections with respect to the 2D video section and the 3D video section, respectively;
a distorted image acquiring part for acquiring a distorted image generated by playing the 3D video section through a 2D player, wherein frames included in the 3D video section are determined by referring to either piece of the information on starting points and the information on ranges of sections with respect to the 2D video section and the 3D video section, respectively;
a rendering part for applying a rendering process to the distorted image through a rendering engine; and
a content providing part for providing, or supporting to provide, a user with a video content including (i) the 2D video section and (ii) a section acquired by applying the rendering process to the distorted image through the rendering engine,
wherein the multidimensional content providing system further comprises: a dimension conversion processing part for performing a dimension conversion process for frames within a redetermined scope from a boundary between the 2D video section and the 3D video section, and
wherein the dimension conversion processing part applies the dimension conversion process to give fade-in or fade-out effects for the 2D video section and the 3D video section within the predetermined scope from the boundary.

12. The system of claim 11, wherein the information on starting points and the information on ranges of sections with respect to the 2D video section and the 3D video section includes a corresponding time zone or a start time or includes corresponding frame section or a start frame number, and wherein the playing section information acquiring part acquires the information on starting points and the information on ranges of sections stored outside the multidimensional content or included in a header of the multidimensional content file.

13. The system of claim 11, wherein the distorted image corresponding to the 3D video section is a bitmap image in a unit of frame and wherein the multidimensional content providing system applies the rendering process to frames in the distorted image by using a sphere type method or a cube type method.

14. The system of claim 11, wherein the multidimensional content is, or is supported to be, provided for a user through a user terminal or at least one display unit connected with it through a wired or a wireless network.

15. The system of claim 11, wherein (i) the multidimensional content in a type of file is downloaded or (ii) data of the multidimensional content are received by using at least one protocol among HTTP and RTMP in real time through a progressive download or a live streaming method from at least one server connected with a user terminal.

16. The system of claim 11, further comprising: a viewing area selecting part for providing, or supporting to provide, the user with a viewing screen area corresponding to a part of all the areas of frames included in the multidimensional content.

17. The system of claim 16, wherein the viewing screen area is decided by referring to setting information inputted by the user or determined by default values.

18. The system of claim 11, wherein the multidimensional content providing system is included in a user terminal.

19. The system of claim 11, further comprising: a synchronizing part for performing a process of synchronizing the video content acquired through the rendering process and audio content corresponding to the acquired video content.

20. A multidimensional content providing system for providing a user with a multidimensional content including a 2D video section and a 3D video section, comprising:
- a playing section information acquiring part for recognizing either piece of information on starting points and information on ranges of sections with respect to the 2D video section and the 3D video section, respectively;
- a distorted image acquiring part for acquiring a distorted image generated by playing the 3D video section through a 2D player, wherein frames included in the 3D video section are determined by referring to either piece of the information on starting points and the information on ranges of sections with respect to the 2D video section and the 3D video section, respectively;
- a rendering part for applying a rendering process to the distorted image through a rendering engine;
- a content providing part for providing, or supporting to provide, a user with a video content including (i) the 2D video section acquired by applying the rendering process to the distorted image through the rendering engine; and
- a border handling part for performing a process of preventing borders occurring in the 2D video section by referring to metadata on the borders caused by difference between the 2D image and the 3D image in number of pixels.

* * * * *